(12) United States Patent
Ghodsi et al.

(10) Patent No.: US 9,959,337 B2
(45) Date of Patent: *May 1, 2018

(54) INDEPENDENT DATA PROCESSING ENVIRONMENTS WITHIN A BIG DATA CLUSTER SYSTEM

(71) Applicant: Databricks Inc., San Francisco, CA (US)

(72) Inventors: Ali Ghodsi, Berkeley, CA (US); Ion Stoica, Piedmont, CA (US)

(73) Assignee: Databricks Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/485,952

(22) Filed: Apr. 12, 2017

(65) Prior Publication Data
US 2017/0220667 A1 Aug. 3, 2017

Related U.S. Application Data

(63) Continuation of application No. 14/824,989, filed on Aug. 12, 2015, now Pat. No. 9,659,081.

(51) Int. Cl.
*G06F 9/46* (2006.01)
*G06F 17/30* (2006.01)
*G06F 9/50* (2006.01)

(52) U.S. Cl.
CPC ...... *G06F 17/30598* (2013.01); *G06F 9/5033* (2013.01); *G06F 9/5072* (2013.01); *G06F 2209/505* (2013.01)

(58) Field of Classification Search
None
See application file for complete search history.

(56) References Cited

U.S. PATENT DOCUMENTS

| | | | |
|---|---|---|---|
| 2012/0102199 A1* | 4/2012 | Hopmann | G06F 9/5044 709/226 |
| 2012/0253780 A1* | 10/2012 | Talla | H04L 49/00 703/23 |
| 2013/0198346 A1* | 8/2013 | Jubran | H04L 41/12 709/220 |
| 2014/0330981 A1 | 11/2014 | Sirota | |
| 2015/0319226 A1* | 11/2015 | Mahmood | H04L 43/0817 709/201 |

* cited by examiner

*Primary Examiner* — Sisley Kim
(74) *Attorney, Agent, or Firm* — Van Pelt, Yi & James LLP

(57) ABSTRACT

A cluster system includes an interface and a processor. The interface is to receive a request from a user associated with one of a plurality of shells. The processor is to determine a plurality of tasks to respond to the request; determine a local set of data and a shared set of data for a task of the plurality of tasks, wherein the local set of data is associated with the one of the plurality of shells; and provide the task, a local set indication, and a shared set indication to a worker associated with the task, wherein the local set indication refers to the local set of data and the shared set indication refers to the shared set of data.

20 Claims, 10 Drawing Sheets

US 9,959,337 B2

INDEPENDENT DATA PROCESSING ENVIRONMENTS WITHIN A BIG DATA CLUSTER SYSTEM

CROSS REFERENCE TO OTHER APPLICATIONS

This application is a continuation of co-pending U.S. patent application Ser. No. 14/824,989, entitled INDEPENDENT DATA PROCESSING ENVIRONMENTS WITHIN A BIG DATA CLUSTER SYSTEM filed Aug. 12, 2015 which is incorporated herein by reference for all purposes.

BACKGROUND OF THE INVENTION

A cluster system comprises a master system controlling a set of worker systems. A user system issues a job to the master system, which breaks it into tasks that can be executed in parallel by the worker systems. Each of the worker systems typically holds a portion of a shared data set that the job operates on. The worker executes its task on its portion of the shared data set, or retrieves other portions of the shared data set from other worker systems, if necessary. The interaction between the user system and the master system is carried out within an environment on the master system. The environment comprises a local state including local variables that are referenced when defining jobs.

BRIEF DESCRIPTION OF THE DRAWINGS

Various embodiments of the invention are disclosed in the following detailed description and the accompanying drawings.

DETAILED DESCRIPTION

Figure 1:
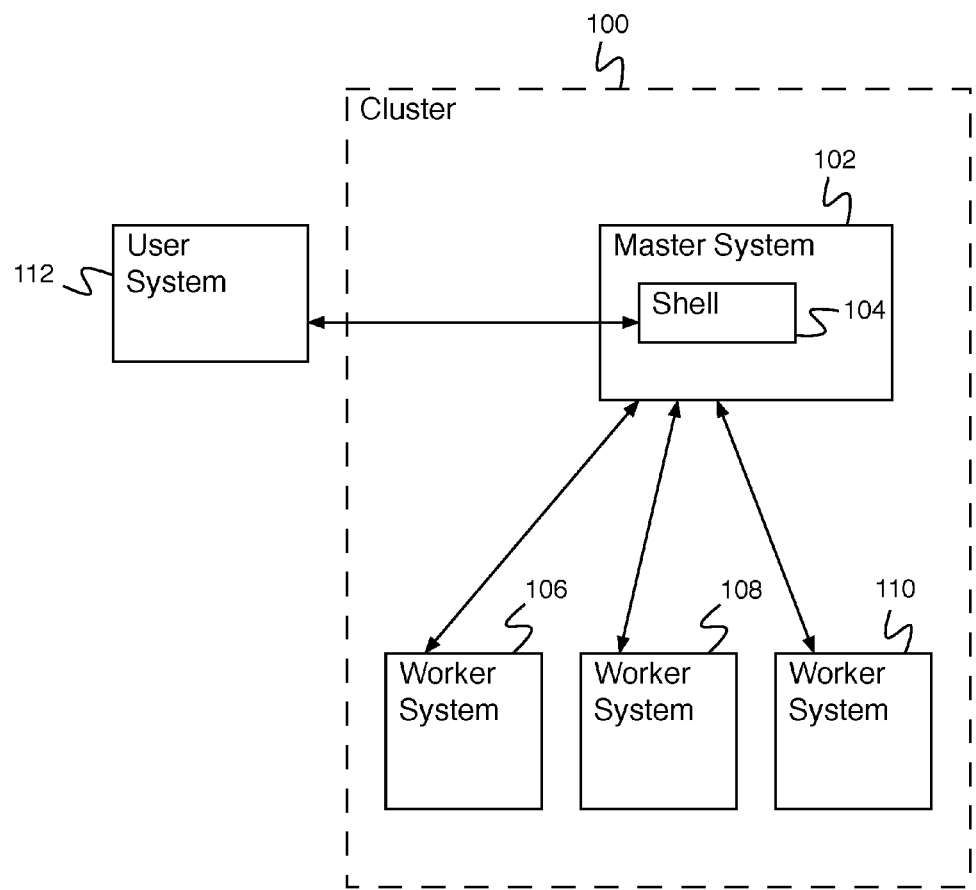
FIG. 1 is a block diagram illustrating an embodiment of a cluster system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A cluster system comprises an interface to receive a request from a user associated with one of a plurality of shells; and a processor to: determine a plurality of tasks to respond to the request; determine a local set of data and a shared set of data for a task of the plurality of tasks, wherein the local set of data is associated with the one of the plurality of shells; and provide the task, a local set indication, and a shared set indication to a worker associated with the task, wherein the local set indication refers to the local set of data and the shared set indication refers to the shared set of data. In some embodiments, the cluster system comprises a memory coupled to the processor and configured to provide the processor with instructions.

In some embodiments, a cluster system comprises a cluster system for executing data processing jobs. In some embodiments, data processing jobs require a computation to be made across a very large database (e.g., a big data set). A portion of the database is loaded onto each of a set of worker systems of the cluster. In some embodiments, portions of the database are shared between worker systems (e.g., the database is too large to be stored on a single worker system but between the set of all worker systems there is more than enough space, so portions are shared). The cluster system comprises a master system for communicating with a user system (e.g., a user system requesting a job), dividing the job into a set of tasks, assigning the tasks to worker systems, collecting the results of the tasks as they are completed by the worker systems, and assembling the results into a completed job result. A user system interacts with the master system within a shell environment running on the master system. The shell holds a state comprising a set of local variables. The user makes use of the state in any appropriate way, for instance, storing the results of jobs for use in future computations, storing a set of input variables to input to jobs, storing values for scripting sets of jobs, etc.

In some embodiments, the cluster system is accessed concurrently by multiple user systems interacting with the master system. For multiple users interacting with the cluster system to perform jobs on the same database (e.g., employees of a company performing analyses on the company user database), the database can remain loaded onto the set of worker systems for the jobs requested by each of the multiple users. Each of the user systems interacts with the master system within its own shell environment running on the master system (e.g., the master system concurrently runs a set of shells). Each shell of the set of shells runs concurrently and independently. Local variables used within a first shell are not accessible from a second shell, and two shells can use local variables with the same name without the two local variables being related in any way. When a job is requested by a user system interacting with a shell on the master system, the master system divides the job into tasks and provides the tasks to the appropriate worker systems. Local variables from the shell are additionally provided from the master system to the worker systems along with an indication of which shell of the set of shells running on the master system the job is associated with. Each of the worker systems maintains a set of local memory spaces for storing local variables associated with a shell of the set of shells. The set of local memory spaces are independent and isolated from one another. When a worker system receives a task associated with a shell from a master system, it accesses local variables stored within local memory space associated with the shell. In the event local variables stored by the worker system need to be updated, they are transmitted from the master system to the worker system with an indication of the associated shell, and the memory on the worker system associated with the shell is updated. The worker system executes the job on its portion of the database, accessing local variables from the local memory space associated with the shell from which the job was requested. In some embodiments, the master system additionally maintains a tracking information memory for tracking a cluster state (e.g., which local variables are stored by which worker systems, which portions of the database are stored by which cluster systems, which tasks are assigned to which cluster systems, etc.).

FIG. 1 is a block diagram illustrating an embodiment of a cluster system. In some embodiments, the cluster system of FIG. 1 comprises a cluster system for executing jobs on a database. In some embodiments, the cluster system of FIG. 1 comprises a cluster system not including independent data processing environments within a big data cluster system. In some embodiments, the database comprises a large database (e.g., a "big data" database). In the example shown, user system 112 interacts with cluster 100. Cluster 100 comprises master system 102 and a plurality of worker systems (e.g., worker system 106, worker system 108, and worker system 110). In various embodiments, cluster 100 comprises 1, 2, 3, 5, 8, 13, 22, 197, or any other appropriate number of worker systems. In some embodiments, the set of worker systems stores database data. In various embodiments, each worker system stores all the database data, the database data is divided evenly between the worker systems, the database data is stored multiple times to fill each worker system to a predetermined capacity, or the database data is stored among the worker systems in any other appropriate way.

In the example shown, when user system 112 interacts with cluster 100, it interacts directly with shell 104 running on master system 102. Shell 104 comprises a shell (e.g., for providing a communication interface for a user system, for interpreting commands from a user system, for storing local variables used by a user system, etc.). When user system 112 provides a command to master system 102 via shell 104 to execute a job, master system 102 divides the job into a set of tasks and provides each task to a worker system. The worker systems execute the tasks and provide the results to master system 102. Master system 102 collects the results of the tasks, determines a job result, and provides the job result to user system 112. In some embodiments, each worker system comprises a multiprocessor computer and is able to process multiple tasks assigned to it by master system 102 concurrently. In various embodiments, user system 112, master system 102, and each worker system of the set of worker systems communicate with one another via local area network, a wide area network, a wired network, a wireless network, the Internet, an intranet, a storage area network, or any other appropriate communication network.

Figure 2:
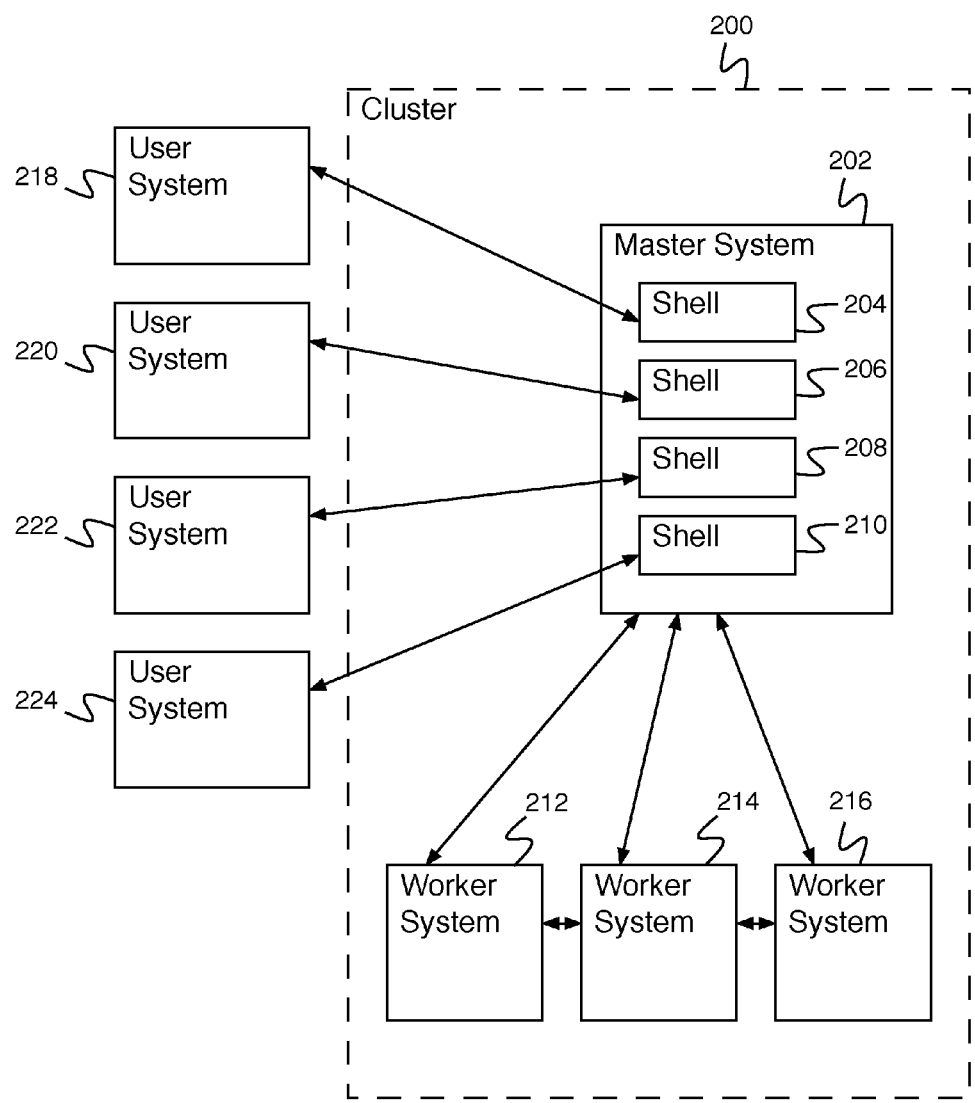
FIG. 2 is a block diagram illustrating an embodiment of a cluster system.

FIG. 2 is a block diagram illustrating an embodiment of a cluster system. In some embodiments, the cluster system of FIG. 2 comprises a cluster system for executing jobs on a database. In some embodiments, the cluster system of FIG. 2 comprises a cluster system including independent data processing environments within a big data cluster system. In some embodiments, the database comprises a large database (e.g., a "big data" database). In the example shown, user system 218, user system 220, user system 222 and user system 224 interact with cluster 200. In various embodiments, the cluster system of FIG. 2 comprises 1, 2, 4, 7, 9, 14, 39, 115, or any other appropriate number of user systems interacting with cluster 200. In the example shown, when a user system interacts with cluster 200, it interacts directly with a shell running on master system 202 (e.g., user system 218 interacts with shell 204, user system 220 interacts with shell 206, user system 222 interacts with shell 208, user system 224 interacts with shell 210). In some embodiments, master system 202 creates a shell for each user system that interacts with it. In some embodiments, shell 204, shell 206, shell 208, and shell 210 are independent (e.g., actions taking place in one shell do not affect actions taking place in another shell). Cluster 200 comprises master system 202 and a plurality of worker systems (e.g., worker system 212, worker system 214, and worker system 216). In various embodiments, cluster 200 comprises 1, 2, 3, 7, 11, 29, 212, or any other appropriate number of worker systems. In some embodiments, the set of worker systems stores database data. In various embodiments, each worker system stores all the database data, the database data is divided evenly between the worker systems, the database data is stored multiple times to fill each worker system to a predetermined capacity, or the database data is stored among the worker systems in any other appropriate way. In some embodiments, each worker system comprises a memory associated with each shell for storing local variables associated with the shell. In some embodiments, when a user system requests a job via a shell on master system 202, master system 202 divides the job into a set of tasks and provides each task to a worker system associated with an indication of the shell the job is associated with. In some embodiments, a worker system uses an indication of a shell associated with a job to determine which of a set of local memories to access to determine local variables associated with the job. In some embodiments, master system 202 provides a worker system with a local set indication referring to a local set of data associated with a shell. In some embodiments, master system 202 provides a worker system with a shared set indication referring to a shared set of data (e.g., database data) for a task. In some embodiments, cluster 200 is only able to process one job at a time. In some embodiments, cluster 200 is able to process multiple jobs concurrently. In some embodiments, each worker system comprises a multiprocessor computer and is able to process multiple tasks assigned to it by master system 202 concurrently (e.g., multiple tasks for the same job, tasks for different jobs, etc.). In various embodiments, each user system of the set of user systems, master system 102, and each worker system of the set of worker systems communicate with one another via local area network, a wide area network, a wired network, a wireless network, the Internet, an intranet, a storage area network, or any other appropriate communication network.

Figure 3:
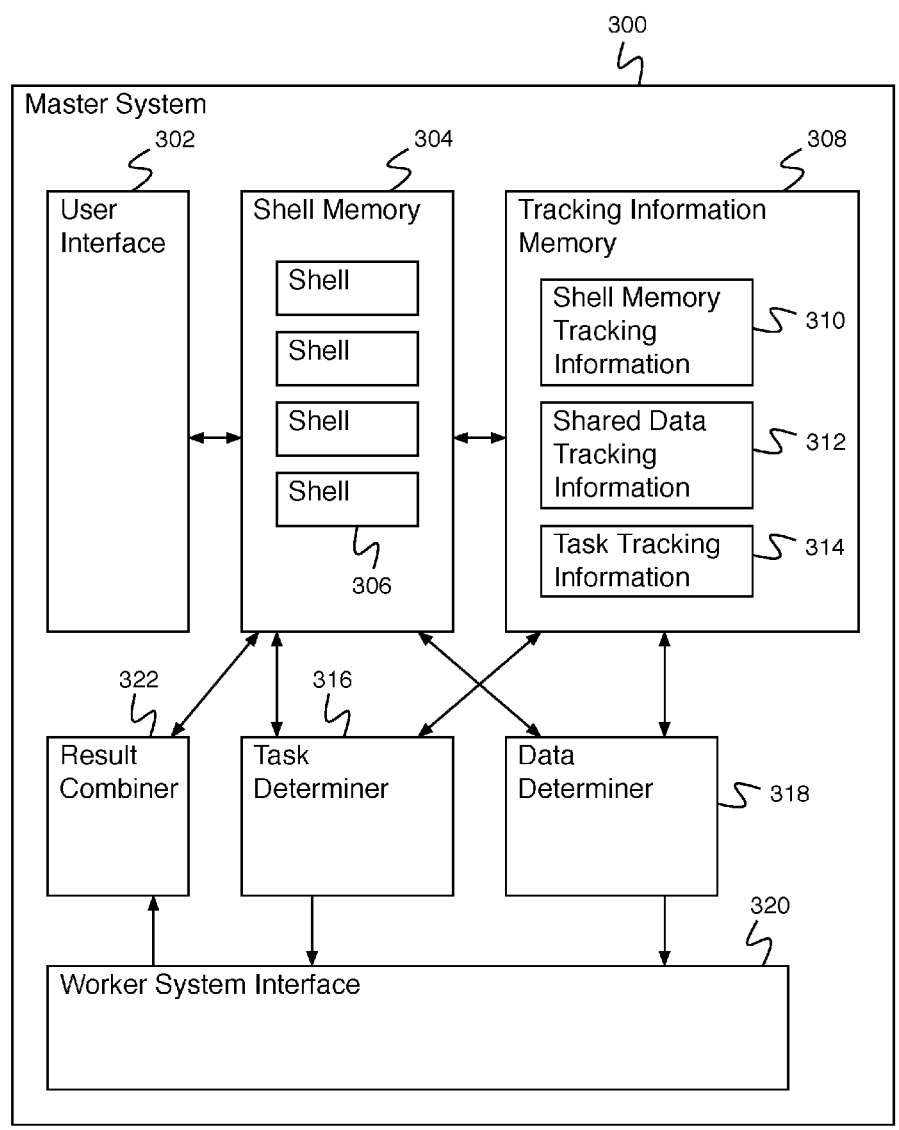
FIG. 3 is a block diagram illustrating an embodiment of a master system.

FIG. 3 is a block diagram illustrating an embodiment of a master system. In some embodiments, master system 300 of FIG. 3 comprises master system 202 of FIG. 2. In the example shown, master system 300 comprises user interface 302. In various embodiments, user interface 302 comprises a user interface for receiving shell commands, receiving job commands, receiving user requests, receiving variable definitions, providing job results, or for providing any other appropriate user interface function. In some embodiments, user interface 302 is implemented using a processor. Shell memory 304 comprises a memory for storing shell information. In some embodiments, shell information comprises local variable values. In some embodiments, shell memory 304 stores a set of shells (e.g., shell 306). Each shell of the set of shells comprises a set of shell information. In some embodiments, each shell of the shells is independent. In some embodiments, shell memory 304 comprises a shell associated with each user system user interface 302 is communicating with. In some embodiments, shell memory 304 is implemented using a processor. Tracking information memory 308 comprises a memory for tracking information states. In some embodiments, tracking information memory 308 comprises a memory for tracking states of worker machines. Tracking information 308 comprises shell memory tracking information 310 for tracking the states of shell memory stored by worker machines (e.g., what shell memory information is stored by each worker machine). Tracking information 308 comprises shared data tracking information 312 for tracking shared data stored by worker machines (e.g., what database information is stored by each worker machine). Tracking information 308 comprises task tracking information for tracking the tasks assigned to worker machines. In some embodiments, tracking information memory 308 is implemented using a processor. Task determiner 316 comprises a task determiner for determining a set of tasks. In some embodiments, task determiner 316 determines a set of tasks from a job received by master system 300 (e.g., via a shell, e.g., shell 306). In some embodiments, task determiner 316 determines a set of tasks to assign to a set of worker systems. In some embodiments, task determiner 316 is implemented using a processor. Data determiner 318 comprises a data determiner for determining data associated with a task. In some embodiments, data comprises a local set of data (e.g., local variables associated with a shell). In some embodiments, data comprises a shared set of data (e.g., a portion of a database). In some embodiments, data determiner 318 is implemented using a processor. Worker system interface 320 comprises a worker system interface for providing information to a worker system. In various embodiments, worker system interface 320 provides a task to a worker system, worker system interface 320 provides a local set indication to a worker system, wherein the local set indication refers to a local set of data, worker system interface 320 provides a shared set indication to a worker system, wherein the shared set indication refers to a shared set of data, or worker system interface 320 provides any other appropriate information to a worker system. In some embodiments, worker system interface 320 comprises a worker system interface for receiving task results. In some embodiments, worker system interface 320 is implemented using a processor. Result combiner 322 comprises a result combiner for combining task results into a job result. In some embodiments, result combiner 322 receives result combining instructions from a shell (e.g., shell 306). In some embodiments, result combiner 322 provides a job result to a shell (e.g., for providing to a user system via user interface 302). In some embodiments, result combiner 322 is implemented using a processor. In various embodiments, the elements of master system 300 are each implemented using separate processors, are all combined onto a single processor, or are combined onto multiple processors in any other appropriate way.

Figure 4:
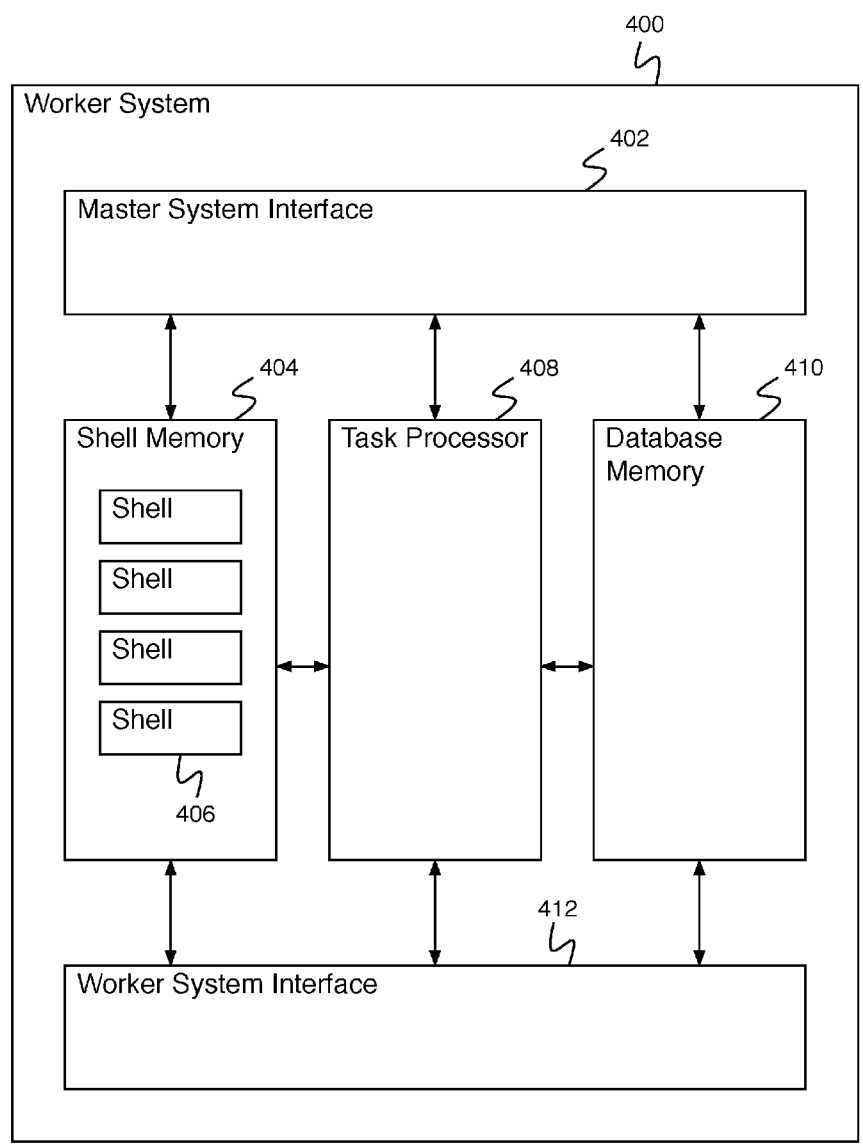
FIG. 4 is a block diagram illustrating an embodiment of a worker system.

FIG. 4 is a block diagram illustrating an embodiment of a worker system. In some embodiments, worker system 400 comprises a worker system of FIG. 2 (e.g., worker system 212 of FIG. 2, worker system 214 of FIG. 2, worker system 216 of FIG. 2, etc.). In the example shown, worker system 400 comprises master system interface 402 for communicating with a master system (e.g., master system 202 of FIG. 2). In various embodiments, master system interface 402 comprises an interface for receiving a task, for receiving shell information, for receiving database data, for receiving an indication of a local set of memory, for receiving an indication of a shared set of memory, for providing a task result, or for any other appropriate interface purpose. Shell memory 404 comprises a shell memory for storing shell information in a shell (e.g., shell 406). In some embodiments, shell information stored in shell memory 404 corresponds to shell information stored in a master system. In some embodiments, shell information stored in shell memory 404 comprises a subset of shell information stored in a master system (e.g., some but not necessarily all shell information is copied from the master system to shell memory 404). Task process 408 comprises a task processor for processing a task (e.g., a task provided by a master system). In various embodiments, task processor 408 accesses data stored in shell memory 404, data stored in database memory 410, data stored in a database memory on another worker system (e.g., via worker system interface 412), or any other appropriate data. Database memory 410 stores database data. In some embodiments, database data is received from a master system via master system interface 402. In some embodiments, database data is received from another worker system via worker system interface 412. In some embodiments, database data stored in database memory 410 is used by task processor 408 to perform tasks. Worker system interface 412 comprises a worker system interface for communicating with other worker systems. In various embodiments, worker system interface 412 comprises an interface for sending or receiving database data requests, worker system interface 412 comprises an interface for sending or receiving database data, or worker system interface 412 comprises an interface for communicating any other appropriate information with another worker system.

In some embodiments, database memory 410 stores shared large data used be multiple processes each with their own separate process memories (e.g., shell memories).

Figure 5:
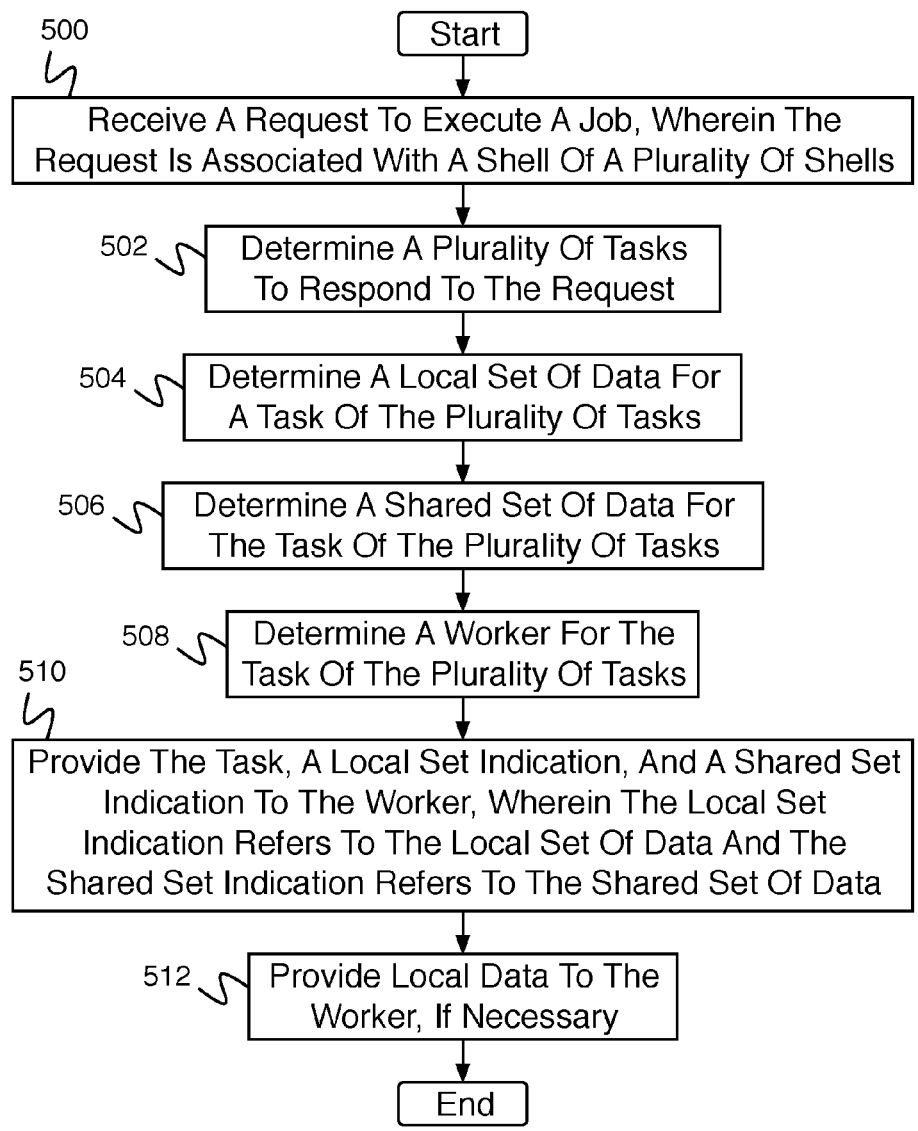
FIG. 5 is a flow diagram illustrating an embodiment of a process for a cluster system.

FIG. 5 is a flow diagram illustrating an embodiment of a process for a cluster system. In some embodiments, the process of FIG. 5 is executed by a master system (e.g., master system 202 of FIG. 2. In the example shown, in 500, a request is received to execute a job, wherein the request is associated with one of a plurality of shells. In some embodiments, the request is received from a user system interacting with the one of the plurality of shells. In 502, a plurality of tasks is determined to respond to the request. In some embodiments, the plurality of tasks comprises a plurality of tasks that can be executed in parallel by a plurality of worker systems. In 504, a local set of data is determined for a task of the plurality of tasks. In some embodiments, the local set of data comprises a set of data associated with the shell of the plurality of shells. In 506, a shared set of data is determined for the task of the plurality of tasks. In some embodiments, the shared set of data comprises database data. In some embodiments, the shared set of database data comprises the database data required to perform the task. In 506, a worker is determined for the task of the plurality of tasks. In some embodiments, a worker comprises a worker system for performing the task. In some embodiments, the worker system is determined based at least in part on the shared set of data (e.g., a worker system that already stores the database data required to perform the task is determined). In some embodiments, a worker system is chosen arbitrarily (e.g., a next worker system, a random worker system, etc.). In 510, the task, a local set indication, and a shared set indication are provided to the worker, wherein the local set indication refers to the local set of data and the shared set indication refers to the shared set of data. In 512, local data is provided to the worker, in the event it is necessary. In some embodiments, the worker already stores the required local data (e.g., as indicated by the local set indication) and so local data does not need to be provided to the worker. In some embodiments, instructions for the steps of the process of FIG. 5 are stored in a memory and provided for execution by a processor coupled to the memory. In various embodiments, the memory comprises a magnetic memory, a solid-state memory, an optical memory, or any other appropriate memory.

Figure 6:
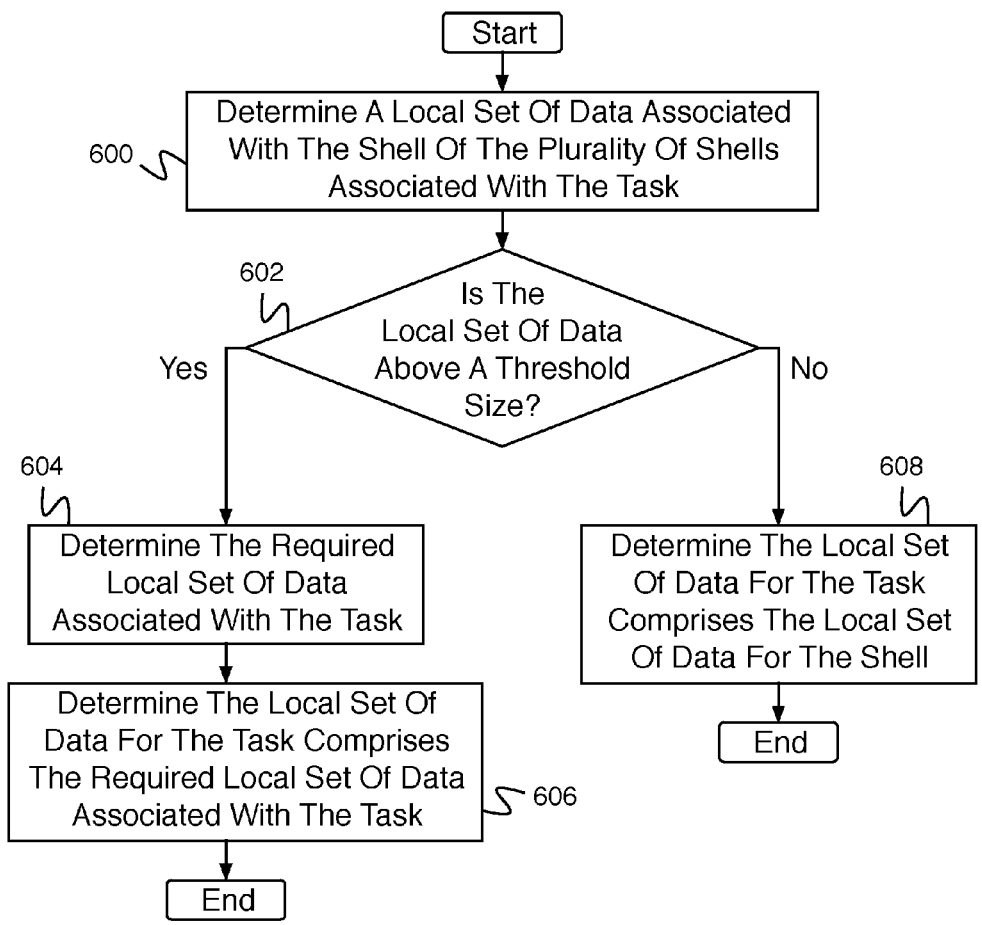
FIG. 6 is a flow diagram illustrating an embodiment of a process for determining a local set of data for a task of a plurality of tasks.

FIG. 6 is a flow diagram illustrating an embodiment of a process for determining a local set of data for a task of a plurality of tasks. In some embodiments, the process of FIG. 6 implements 504 of FIG. 5. In the example shown, in 600, a local set of data associated with the shell of the plurality of shells associated with the task is determined. The local set of data comprises all shell information of the shell of the plurality of shells. In some embodiments, the set of data comprising all shell information of a shell is typically very small, for example, a small number of variable values, etc. In 602, it is determined whether the local set of data is above a threshold size. In some embodiments, the local set of data is typically not above the threshold size. In the event it is determined that the local set of data is above the threshold size, control passes to 604. In the event it is determined that the local set of data is not above the threshold size, control passes to 608. In 608, it is determined that the local set of data for the task comprises the local set of data for the shell, and the process ends. In 604, the required local set of data associated with the task is determined. In some embodiments, the required local set of data associated with the task is determined by analyzing the task to determine any local variables accessed by the task, and assigning those local variables to the required local set of data associated with the task. In 606, it is determined that the local set of data for the task comprises the required local set of data associated with the task.

Figure 7:
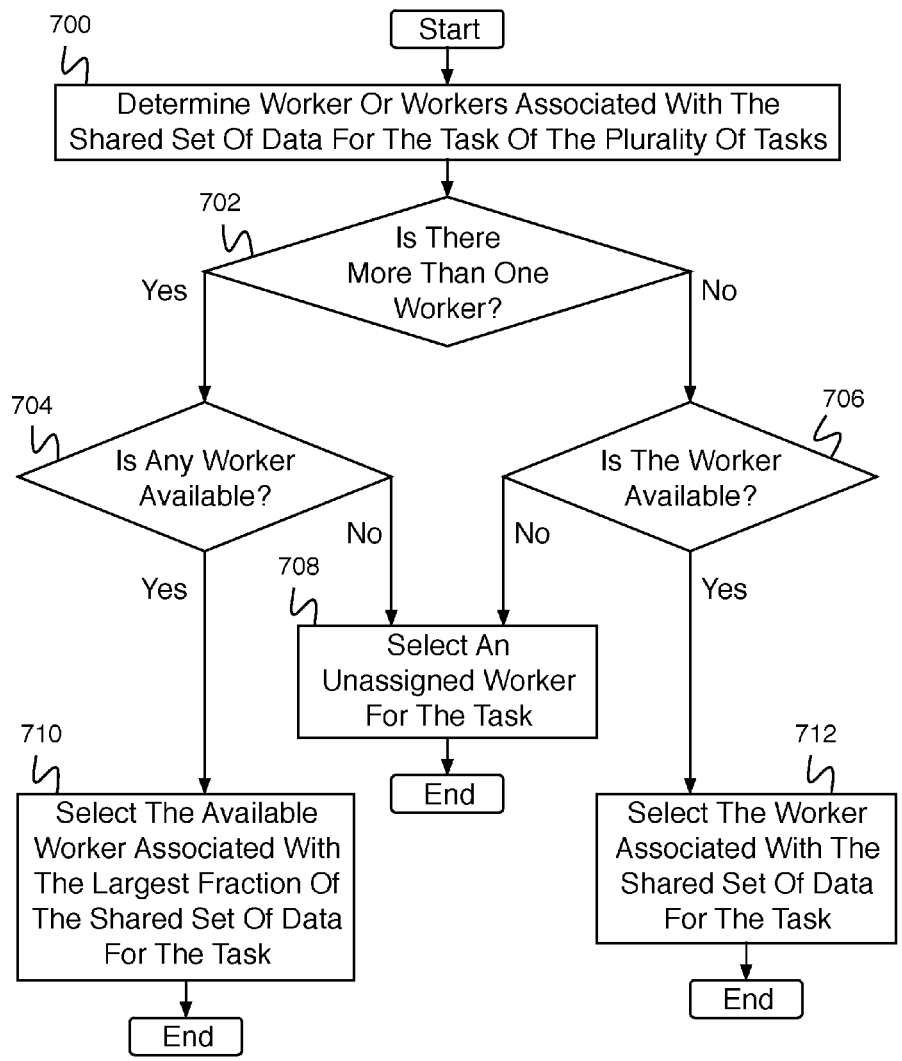
FIG. 7 is a flow diagram illustrating an embodiment of a process for determining a worker for a task of a plurality of tasks.

FIG. 7 is a flow diagram illustrating an embodiment of a process for determining a worker for a task of a plurality of tasks. In some embodiments, the flow diagram of FIG. 7 implements 508 of FIG. 5. In the example shown, in 700, the worker or workers associated with the shared set of data for the task of the plurality of tasks is determined. In some embodiments, a worker associated with a shared set of data comprises a worker storing a shared set of data. In some embodiments, more than one worker is associated with the shared set of data because the shared set of data is stored distributed across two or more workers. In some embodiments, more than one worker is associated with the shared set of data because at least a portion of the shared set of data is stored by two or more workers. In some embodiments, in the event that there are no workers associated with the shared set of data, then a new or unassigned worker is selected for the task. In some embodiments, a second worker is associated with a second task of the plurality of tasks. In some embodiments, determining a second worker comprises determining shared data workers for the second task. In 702, it is determined whether there is more than one worker (e.g., more than one worker associated with the shared set of data for the task of the plurality of tasks). In the event it is determined that there is more than one worker, control passes to 704. In the event it is determined that there is not more than one worker, control passes to 706. In 706, it is determined whether the worker is available. In some embodiments, a worker is available in the event it is not processing a task. In some embodiments, a worker is available in the event it is processing fewer than the maximum number of tasks (e.g., some workers comprise multiprocessor computers capable of performing multiple tasks simultaneously). In the event it is determined that the worker is not available, control passes to 708. In the event it is determined that the worker is available, control passes to 712. In 712, the worker associated with the shared set of data for the task is selected, and the process ends. In 708, an unassigned worker is selected for the task. In various embodiments, an unassigned worker is selected randomly, a next unassigned worker is selected, a worker is selected based at least in part on historical performance, a worker is selected based at least in part on physical proximity to a holding worker associated with the shared set of data, or a worker is selected in any other appropriate way. The process then ends. In some embodiments, an unassigned or new worker is selected for the second task in the event that there are no workers associated with the shared set of data. In 704, it is determined whether any worker (e.g., any worker associated with the shared set of data for the task) is available. In the event it is determined that no worker is available, control passes to 708. In the event it is determined that any worker is available, control passes to 710. In 710, the available worker associated with the largest fraction of the shared set of data for the task is selected. For example, a most overlap worker is selected based on a largest fraction of the shared set of data for the second task associated with shared data stored on the most overlap worker of the shared data workers.

Figure 8:
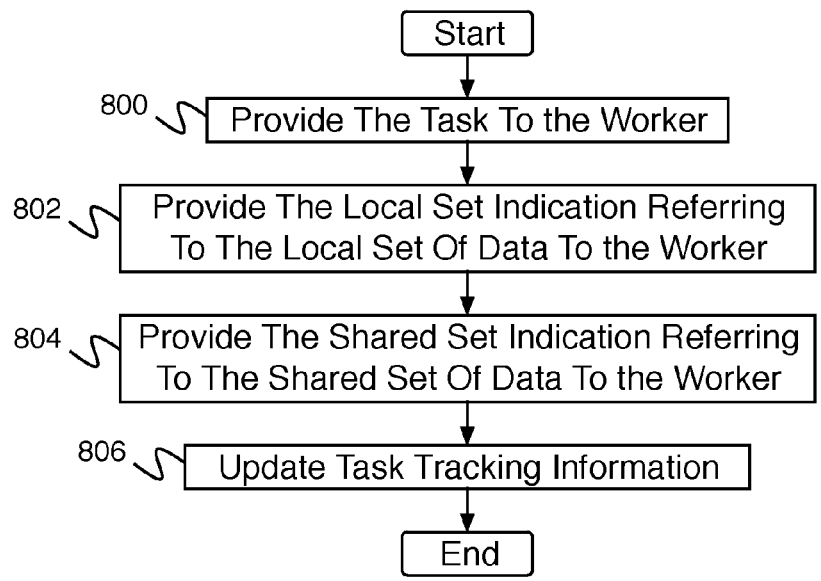
FIG. 8 is a flow diagram illustrating an embodiment of a process for providing a task, a local set indication, and a shared set indication to a worker, wherein the local set indication refers to a local set of data and the shared set indication refers to a shared set of data.

FIG. 8 is a flow diagram illustrating an embodiment of a process for providing a task, a local set indication, and a shared set indication to a worker, wherein the local set indication refers to a local set of data and the shared set indication refers to a shared set of data. In some embodiments, the process of FIG. 8 implements 510 of FIG. 5. In the example shown, in 800, the task is provided to the worker. In 802, the local set indication referring to the local set of data is provided to the worker. In 804, the shared set indication referring to the shared set of data is provided to the worker. In 806, task tracking information (e.g., task tracking information of a tracking information memory) is updated. In some embodiments, task tracking information is updated to indicate the task has been provided to the worker.

Figure 9:
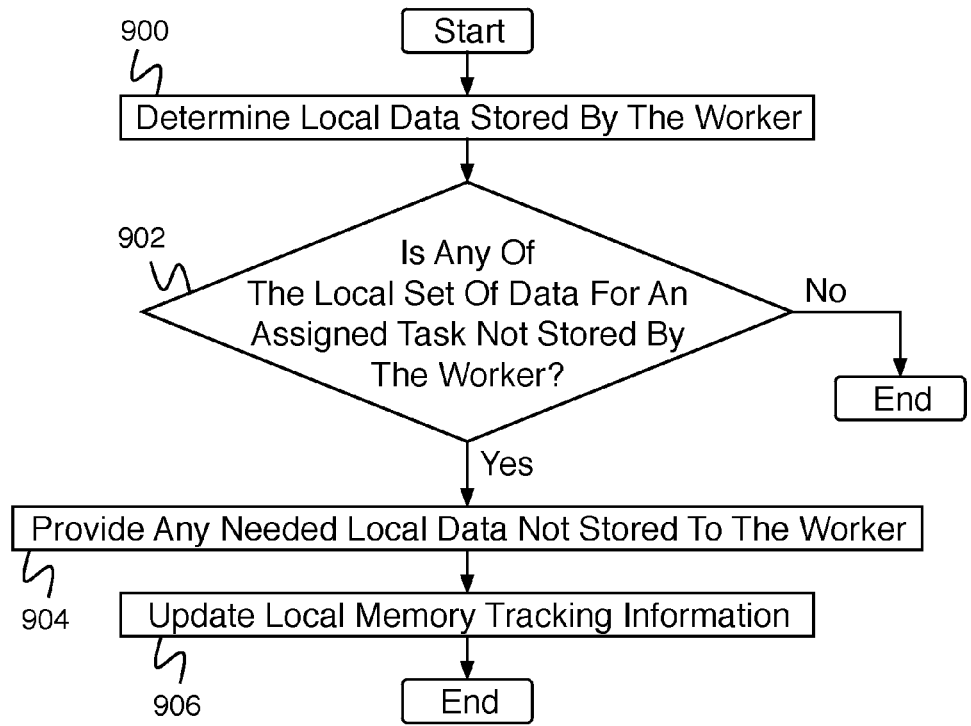
FIG. 9 is a flow diagram illustrating an embodiment of a process for providing local data to a worker, if necessary.

FIG. 9 is a flow diagram illustrating an embodiment of a process for providing local data to a worker, if necessary. In some embodiments, the process of FIG. 9 implements 512 of FIG. 5. In the example shown, in 900, local data stored by the worker is determined. In 902, it is determined whether any of the local set of data for an assigned task is not stored by the worker. In the event it is determined that none of the local set of data for the assigned task is not stored by the worker, the process ends. In the event it is determined that any of the local set of data for the assigned task is not stored by the worker, control passes to 904. In 904, any needed local data not stored is provided to the worker. In 906, local memory tracking information (e.g., local memory tracking information of a tracking information memory) is updated. In some embodiments, local memory tracking information is updated to indicate the needed local data has been provided to the worker.

Figure 10:
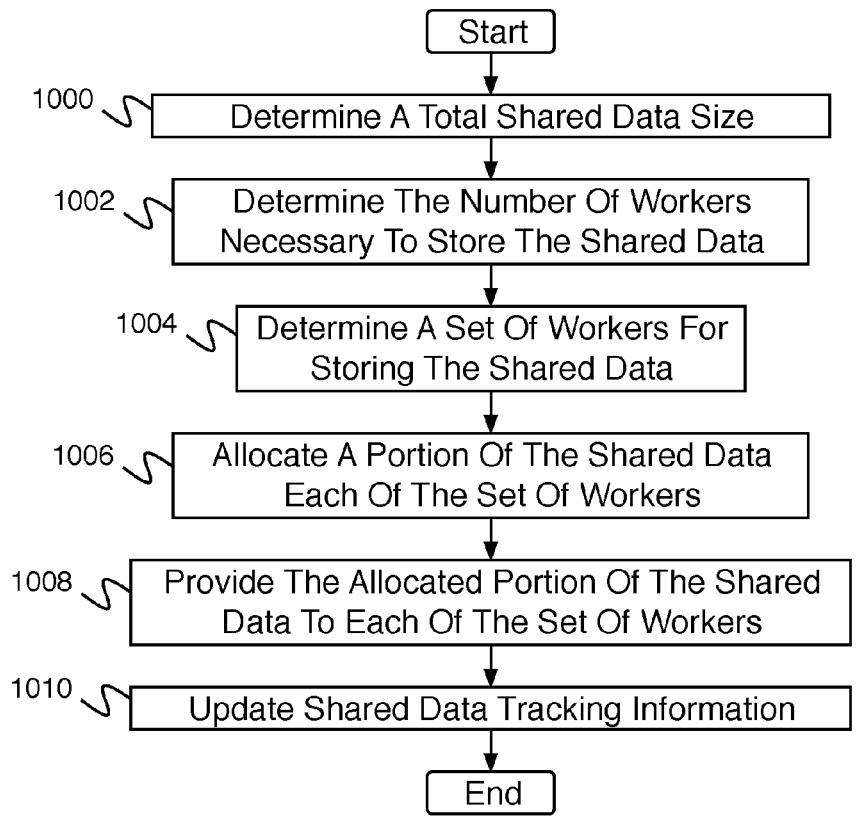
FIG. 10 is a flow diagram illustrating an embodiment of a process for providing shared data to a set of workers.

FIG. 10 is a flow diagram illustrating an embodiment of a process for providing shared data to a set of workers. In some embodiments, the process of FIG. 10 is executed by a master system (e.g., master system 202 of FIG. 2). In the example shown, in 1000, a total shared data size is determined. In 1002, the number of workers necessary to store the shared data is determined. In 1004, a set of workers for storing the shared data is determined. In some embodiments, a set of workers for storing the shared data is determined by determining workers that are not already storing shared data. In 1006, a portion of the shared memory is allocated to each of the set of workers. In 1008, the allocated portion of the shared data is provided to each of the set of workers. In 1010, shared data tracking information (e.g., shared data tracking information of a tracking information memory) is updated. In some embodiments, shared data tracking information is updated to indicate the allocated portions of the shared data have been provided to the workers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor configured to:
   receive a request associated with one of a plurality of shells;
   determine a local set of data and a shared set of data for a task based on the request, wherein the local set of data is accessed by a specific one of the plurality of shells such that a first variable included in a first shell represents data independent of data represented by a second variable included in a second shell and the shared set of data has a shared set indication;
   provide the task, a local set indication, and the shared set indication to a worker associated with the task, wherein the local set indication is associated with the local set of data;
   receive a task result from the worker;
   generate a job result including combining the task result with at least one other task result; and
   output the job result.

2. The processor of claim 1, wherein the task result and the at least one other task result are combined based on an instruction received from at least one of the plurality of shells.

3. The processor of claim 1, wherein the processor is further configured to determine data associated with the task.

4. The processor of claim 3, wherein the data associated with the task includes the local set of data and the shared set of data.

5. The processor of claim 4, wherein the shared set of data includes data shared by a plurality of workers.

6. The processor of claim 1, wherein the processor is further configured to provide the local set of data.

7. The processor of claim 1, wherein the processor is further configured to determine whether to provide local data.

8. The processor of claim 1, wherein the processor is communicatively coupled to a memory to store a local set of data associated with each of the plurality of shells.

9. The processor of claim 1, wherein the processor is further configured to update task tracking information in response to the provision of the task and a local set indication to a worker associated with the task.

10. The processor of claim 1, wherein the processor is further configured to update memory tracking information in response to the provision of the task and a local set indication to a worker associated with the task.

11. The processor of claim 10, wherein the tracking information includes a state of a worker machine.

12. The processor of claim 10, wherein the tracking information includes a state of shell memory.

13. The processor of claim 10, wherein the tracking information includes shared data of worker machines.

14. The processor of claim 10, wherein the tracking information includes a mapping between tasks and workers.

15. The processor of claim 10, wherein tracking information comprises an indication of local data stored by a worker.

16. The processor claim 1, wherein the processor is further configured to determine a second worker associated with a second task.

17. The processor of claim 16, wherein the determination of the second worker includes determining shared data workers for the second task.

18. The processor of claim 16, wherein the generation of the job result includes combining a result of the task with a result of the second task.

19. A method, comprising:
   receiving a request associated with one of a plurality of shells;
   determining a local set of data and a shared set of data for a task based on the request, wherein the local set of data is accessed by a specific one of the plurality of shells such that a first variable included in a first shell represents data independent of data represented by a second variable included in a second shell and the shared set of data has a shared set indication;
   providing the task, a local set indication, and the shared set indication to a worker associated with the task, wherein the local set indication is associated with the local set of data;
   receiving a task result from the worker;
   generating a job result including combining the task result with at least one other task result; and
   outputting the job result.

20. A computer program product embodied in a non-transitory computer readable storage medium and comprising computer instructions for:
   receiving a request associated with one of a plurality of shells;
   determining a local set of data and a shared set of data for a task based on the request, wherein the local set of data is accessed by a specific one of the plurality of shells such that a first variable included in a first shell represents data independent of data represented by a second variable included in a second shell and the shared set of data has a shared set indication;

providing the task, a local set indication, and the shared set indication to a worker associated with the task, wherein the local set indication is associated with the local set of data;
receiving a task result from the worker;
generating a job result including combining the task result with at least one other task result; and
outputting the job result.

* * * * *